United States Patent [19]
Doyle et al.

[11] 3,894,399
[45] July 15, 1975

[54] CHEMICAL GROUTING PROCESS FOR TIGHT SOIL

[75] Inventors: Earl H. Doyle; David Kauffman; John A. Herce, all of Houston, Tex.

[73] Assignee: Shell Oil Company, Houston, Tex.

[22] Filed: May 22, 1974

[21] Appl. No.: 472,004

[52] U.S. Cl. ................................................. 61/36
[51] Int. Cl.² ..................................... E02D 3/12
[58] Field of Search ............ 61/36, 35, 39; 166/276, 166/274, 281, 294

[56] References Cited
UNITED STATES PATENTS

| | | |
|---|---|---|
| 3,530,081 | 9/1970 | Herrick et al. .................. 61/36 R X |
| 3,545,130 | 12/1970 | Strother et al. .................. 61/36 R X |
| 3,548,944 | 12/1970 | Hess ................................. 61/36 R X |
| 3,741,308 | 6/1973 | Veley ............................... 61/36 R X |
| 3,756,315 | 9/1973 | Suman et al. ........................ 166/276 |
| 3,759,197 | 9/1973 | Bracke ............................. 61/36 R X |
| 3,776,311 | 12/1973 | Carnes et al. .................... 61/36 R X |

Primary Examiner—Dennis L. Taylor

[57] ABSTRACT

The strength of a selected portion of a soil formation in which the pores are too small to receive a cement slurry is improved by injecting a hydrated metal oxide depositing solution at a rate producing a fluid velocity in the pores of the selected portion of at least about 0.3 centimeters per minute.

9 Claims, 4 Drawing Figures

UNCONFINED COMPRESSIVE STRENGTH, PSI →

DISTANCE FROM INJECTION FACE, INCHES →

CHEMICAL GROUTING PROCESS FOR TIGHT SOIL

BACKGROUND OF THE INVENTION

The invention relates to strengthening a soil formation by injecting a fluid that increases the compressive strength of the formation. Such a strengthening is at least one objective of a grouting process for treating a loosely consolidated soil formation such as a sand or a silt.

Where the soil formation contains particles smaller than about 0.5 millimeters (average diameters) the pores, or spaces between the particles, are generally too small to receive a cement slurry. Chemical grouts comprising a true solutions of various materials were developed for treating such tight formations, because they can be injected into the small pores. Since a slurry of a cement, such as Portland Cement, is far cheaper than a chemical grout, the grout is generally used only when the soil is tight and the zone to be treated is located or arranged so that it cannot be economically removed and replaced with concrete.

A number of different chemical systems have been used as chemical grouts. The most common involve a precipitation of an insoluble silicate (such as the precipitating of calcium silicate by mixing solutions of calcium chloride and sodium silicate) or other means for converting a soluble silicate to an insoluble silicate. Among organic chemical grouts, commonly used materials include solutions for forming urea-formaldehyde resins, acrylamide resins, or polyurethane resins, that polymerize and/or become cross-linked within the formation being treated.

The G. O. Suman, Jr., E. A. Richardson, and R. F. Scheuerman U.S. Pat. No. 3,756,315 describes hydrated metal oxide-depositing solutions for consolidating or plugging permeable granular materials. It describes basic aqueous solutions in which oxides of amphoteric metals are mixed with pH-reducing reactants that subsequently lower the pH and cause a hydrated oxide of the amphoteric metal to be precipitated.

SUMMARY OF THE INVENTION

The present invention relates to an improved process for strengthening a soil in which the pores are too small to be penetrated by a slurry of cement. Means for injecting fluid is arranged for flowing fluid into a selected zone within such a soil formation at a rate such that the fluid velocity in the pores in that zone is at least about 0.3 cm per minute. A determination is made of the extent of time-temperature exposure to which a fluid is subjected when it flows at the selected rate from a fluid-compounding location to the selected zone within the soil formation. A basic aqueous solution of an amphoteric metal oxide and a pH-reducing reactant that begins precipitating a hydrated metal oxide after being subjected to substantially the determined extent of time-temperature exposure is prepared at the fluid-compounding location. And, the so-prepared solution is flowed into the selected zone at the selected rate while the time and temperature conditions of the compounding and storing of the fluid are adjusted so that substantially all portions of the solution are subjected to substantially the determined extent of time-temperature exposure.

DESCRIPTION OF THE INVENTION

Figure 1:
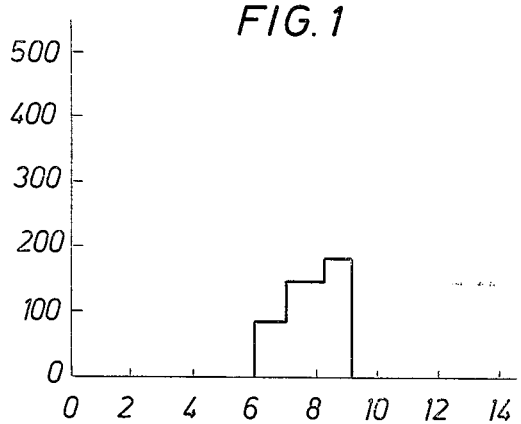
FIGS. 1 to 4 illustrate bar graphs of comressive strengths at different distances from the point of injecting a strengthening fluid of the present invention into a soil formation.

The present invention is, at least in part, premised on the discovery that:

1. In strengthening a soil formation (where the pores are too small to be penetrated by a cement slurry and the temperature is substantially normal atmospheric temperature) by injecting a hydrated metal oxide depositing solution of the type described in U.S. Pat. No. 3,756,315, the attaining and maintaining of a fluid velocity in the pores of at least 0.3 cm per minute is essential to the attaining of a significant increase in the strength of the soil formation, and 2. When such a soil formation is so treated, its compressive strength is: (a) significantly greater than those provided by previously used single fluid chemical grouting systems (such as mixtures of sodium silicate with lime water, or sodium carbonate, or ethyl acetate; or resinforming systems for forming urea formaldehyde resins, acrylamide resins, or polymers of calcium acrylates or polyurethanes) and (b) substantially equal to those provided by a two-fluid system that requires an injection of a sodium silicate solution followed by an injection of a calcium chloride solution.

In arranging fluid injection means for flowing fluid into a selected zone at a selected rate in accordance with this invention, a wide variety of techniques and equipment can be utilized, as long as the arrangement is adapted to provide a fluid velocity in the pores within the selected zone of at least 0.3 cm per minute without fracturing the formation. Where the soil permeability is in the order of 2 to 4 darcies or more, gravity flow may provide a sufficient fluid velocity. Where the permeability is lower, additional pressure must be supplied. In the present process a fluid velocity of 1.5 cm per minute in pores of a sand pack of grains having average diameters of from about 0.012 to 0.018 cm and a permeability of about 1 darcy is readily attainable since the viscosity of the injected fluid is not significantly greater than 1 centipoise. Depending upon the nature of the operation and the location of the zone within the soil formation to be strengthened, the present treating fluids can be injected by means of a flow through the walls or the bottom of a ditch or pond or well, or the like. A pattern of injection and production wells, or locations, can be utilized.

Numerous types of devices and techniques can be used for determining the exent of the time-temperature exposure to which a fluid is subjected as it flows from a fluid-compounding location to a selected zone within a soil formation. The extent of exposure can be determined from calculations based on the temperature in the respective locations and the flow rate known to be attainable in soil formations of similar permeability and location, and/or by measurements of one or more of such quantities at the site of the soil-strengthening operation to be conducted. As known to those skilled in the art, a given extent of time-temperature exposure relative to the completion of a chemical reaction (such as the presently involved precipitation of a hydrated metal oxide) can be provided by various alternatives such as a short time at high temperature, an intermediate time at an intermediate temperature, or a long time at a low temperature, or the like. In the present process, it is generally preferable to use an extent of exposure that is readily attainable by flowing the fluid into the selected region at the ambient temperature of the region after the fluid has undergone a moderate residence time at the normal temperature of a conveniently situated fluid-compounding location. Where desirable, however, the fluid can be heated or cooled at or near the fluid-compounding location and/or the flow path between that location and the selected region can be lengthened or shortened to increase or decrease the extent of time-temperature exposure.

The hydrated metal oxide-depositing basic aqueous solution, of an amphoteric metal oxide and a pH-reducing reactant, can be prepared from substantially any compositions and proportions of such reactants that provide a solution that begins precipitating the hydrated metal oxide when it is subjected to substantially the determined extent of time-temperature exposure. Numerous materials that are useful in forming such a solution and ways of adjusting the composition and proportions of them in order to provide an initiation of the precipitation in response to a given extent of time-temperature exposure, are described in U.S. Pat. No. 3,756,315. In the present process, the use of such a solution in which the amphoteric metal oxide is aluminum oxide and the pH-decreasing reactant is at least one of the group formamide, acetamide, dimethylformamide, or urea, is preferred.

When determinations have been made of the length of the flow path from a fluid-compounding location to a selected zone in a soil formation and the rate of flow to be used in providing a selected fluid velocity in the pores of the soil in the zone to be treated, calculations can be made with respect to determining the location of the initial precipitation of a hydrated metal oxide with respect to the initial precipitation time of the particular basic solution of amphoteric metal oxide to be used. For example:

the location of the initial precipitation can be found as follows:

$$CPD = (\nu)(IPT)$$

where
CPD = "calculated precipitation distance" measured from the point of injection
$\nu$ = injection velocity in the pores
IPT = "initial precipitation time"

In turn, for rectilinear (nonradial) flow situations, $$\nu = \frac{F}{\epsilon A}$$

where
F is the volumetric flow rate of the solution
$\epsilon$ is the formation porosity
A is the cross-sectional area of the injection face Where the basic aqueous solution is a solution of aluminum oxide, the initial precipitation time (IPT) depends on the concentration of the aluminate and hydrolysis chemicals, the choice of hydrolysis chemical, and the temperature. For most applications, the IPT should be experimentally verified. The following correlation is accurate to about ± 50 percent, however, and can be used as an initial guide:

$$IPT = AC^{-n} e^{-B\left(\frac{T-550}{T}\right)}$$

where
IPT is measured in minutes
T is the temperature in °R
C is the aluminate concentration in g. moles/liter (hydrolysis chemical concentration is assumed to be slightly greater than aluminate concentration).
A, B and n are constants depending on the choice of hydrolysis chemical as follows:

|  | A | B | $\mu$ |
|---|---|---|---|
| Formamide | 10.7 | 19.2 | 0.76 |
| Acetamide | 140 | 14.6 | 0.65 |
| Dimethyl formamide | 65 | 19.1 | 0.7 |
| Urea | 80000 | 46.2 | 0.95 |

Figure 2:
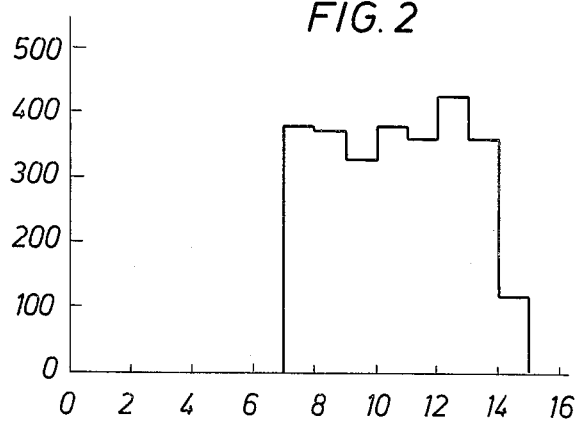
Figure 3:
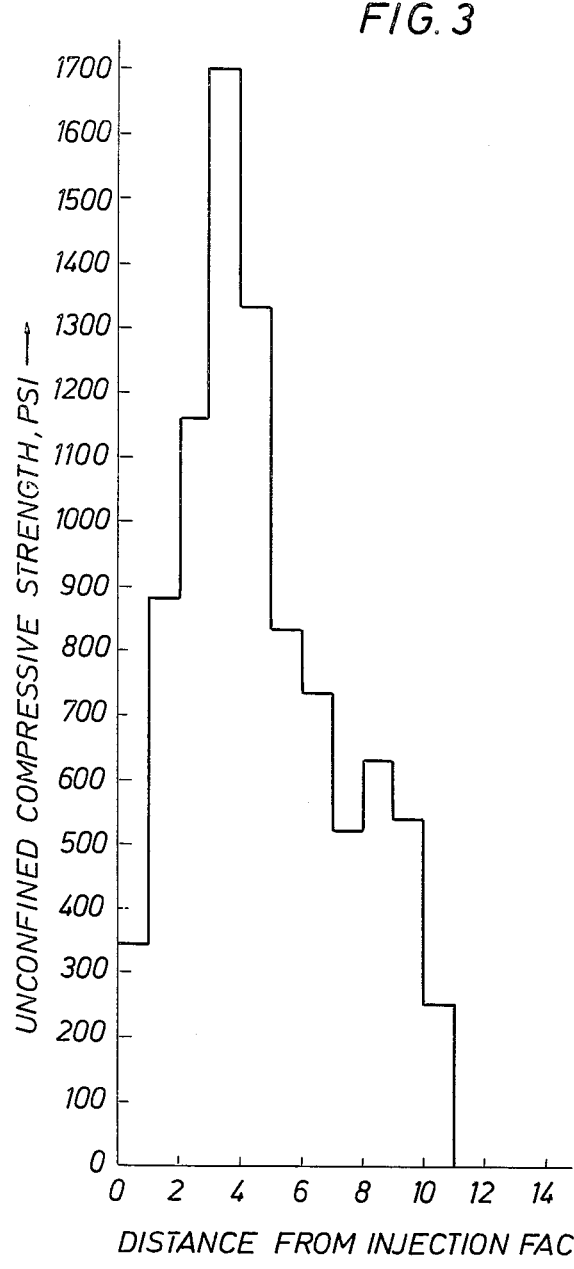
Figure 4:
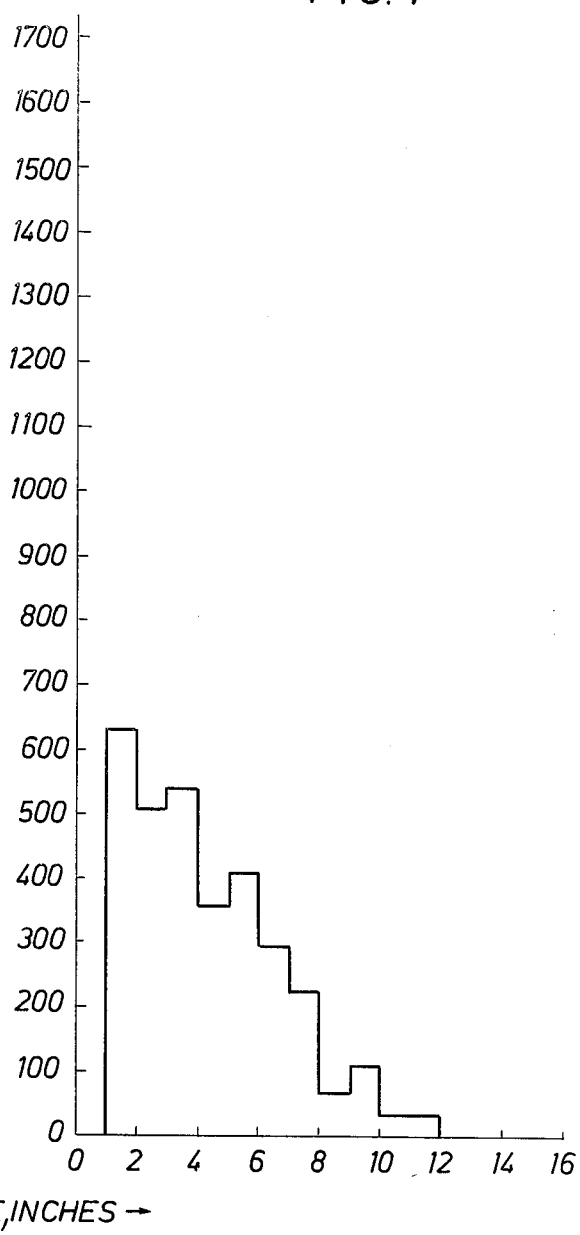

FIGS. 1 to 4 show the results of four laboratory tests of the present invention. Each test was conducted by pumping a solution vertically upward through a 1-inch diameter by 16-inch long packed column of No. 5 Clemtex sand (80–120 U.S. sieve size). The columns had average grain diameters of 0.012 to 0.018 cm and permeabilities of about 1 darcy (at a normal room temperature of about 75°F.) Each solution contained 1.0 moles per liter sodium aluminate and 1.1 moles per liter of the pH-reducing reactant. In tests 1, 2 and 3, the latter was formamide, and in test 4 it was acetamide.

The amount of the solution that was injected was varied so that, in tests 1, 2 and 3, the amounts were respectively, 240, 480 and 960 milliliters. In test 4 the amount was 480 ml. Those amounts correspond to 7.55, 15.1 and 30.2 pounds of alumina (as aluminum hydroxide) per square foot of cross-sectional area of the soil formation through which the solution was flowed. In each test, the solution was flowed at a rate of 2.3 milliliters per minute, which provided a velocity of about 1.5 centimeters per minute in the pore spaces of the sand packs (which had a mean porosity of 0.29).

Each of the solutions were formulated so that the initial precipitation would take place about 7 inches from the injection face of the sand packs (at points demarked by the arrows on the figures). Where formamide was the pH-reducing reactant, this was accomplished by simply compounding and promptly injecting the solution. Where the pH-reducing reactant was acetamide, the time-temperature exposure of the compounded solution was increased by heating it at 110°F for 80 minutes prior to its injection.

After the specified amount of treating solution had been injected, each sand pack was sealed off at the bottom and stored vertically at room temperature for about three to four days. The packs were then cut into one-inch segments and tested for unconfined compressive strength. The results of such tests are plotted in pounds per square inch versus distance in inches from the point of injection (i.e., the injection face of the sandpack).

The results of the above and similar tests have indicated that the amount of strength that is imparted to the treated portion of soil formation increases with increases in the amounts of the treating solution that is flowed through that soil. In addition, the size of the treated region increases with increases in volume of treating solution. The strength of the treated zone begins to increase at or near the point where the initial precipitation of the hydrated metal oxide occurs. The size of the treated zone increases in both an upstream and downstream direction relative to the flow of the treating solution.

In view of the above and similar tests it is apparent that, in treating relatively fine grained unconfined soil formations of the type to which this invention is directed, the attainment of a minimum fluid velocity in the pores of at least about 0.3 centimeters per minute, is relatively critical. Below that rate, for example, at velocities of from 0 to 0.1 cm per min., although numerous tests were made, no strength-imparting consolidations were obtained. Particularly good consolidations were obtained with velocities of about 1.5 cm per min. and successful consolidations have been obtained with velocities as high as 3.0 centimeters per minute.

As known to those skilled in the art, the injecting of fluid at higher velocities generally requires increases in the injection pressure. In the present process, higher injection pressures are suitable only when the soil formation being treated are confined (for example, under overlying earth formations and/or other structures) in a manner that inhibits the fracturing of the formations.

What is claimed is:

1. In a process for strengthening a selected zone within a soil formation in which the pores are too small to be penetrated by a slurry of cement, the improvement which comprises:

arranging fluid injecting means for flowing fluid into and through the selected zone within the soil formation at a rate selected so that it provides a fluid velocity in the pores of the selected zone of at least 0.3 centimeters per minute without fracturing the formation;

determining the extent of time-temperature exposure to which a fluid is subjected when it flows at the selected rate from a fluid-compounding location to the selected zone within the soil formation;

compounding a basic aqueous solution of an amphoteric metal oxide and a pH-reducing reactant that begins precipitating a hydrated metal oxide when it has been subjected to substantially the determined extent of time-temperature exposure; and flowing the compounded solution into the selected zone within the soil formation at the selected rate while adjusting the time and temperature conditions of the compounding and storing of the fluid so that substantially all portions are subjected to substantially the determined extent of time-temperature exposure.

2. The process of claim 1 in which the flowing of the compounded solution into and through the selected zone is continued until the amount flowed through that zone contains at least about 15 pounds of hydrated metal oxide per square foot of soil formation.

3. The process of claim 1 in which the rate at which the fluid is flowed into the selected zone provides a fluid velocity in the pores of that zone of from about 0.3 to 3.0 centimeters per minute.

4. The process of claim 1 in which the temperature and time conditions of the compounding and storing of the solution being flowed into the selected zone are increased to increase the extent of the time-temperature exposure to which the fluid is subjected.

5. The process of claim 1 in which the amphoteric metal oxide in the basic aqueous solution is aluminum oxide.

6. The process of claim 1 in which the pH-increasing reactant in the basic aqueous solution is formamide.

7. The process of claim 1 in which the pH-reducing reactant in the basic aqueous solution is acetamide.

8. The process of claim 1 in which the pH-reducing reactant in the basic aqueous solution is dimethylformamide.

9. The process of claim 1 in which the pH-reducing reactant in the basic aqueous aqueous solution is urea.

* * * * *